(12) United States Patent
Deng et al.

(10) Patent No.: US 11,156,496 B2
(45) Date of Patent: Oct. 26, 2021

(54) METHOD FOR DETECTING BANDWIDTH OF LINEAR VIBRATION MOTOR

(71) Applicant: AAC Technologies Pte. Ltd., Singapore (SG)

(72) Inventors: Hanlin Deng, Shenzhen (CN); Liang Jiang, Shenzhen (CN); Zheng Xiang, Shenzhen (CN); Xiang Lu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 159 days.

(21) Appl. No.: 16/530,967

(22) Filed: Aug. 2, 2019

(65) Prior Publication Data

US 2020/0056933 A1    Feb. 20, 2020

(30) Foreign Application Priority Data

Aug. 15, 2018  (CN) .......................... 201810925634.6

(51) Int. Cl.
 *G01H 1/00* (2006.01)
 *H02P 25/032* (2016.01)
 *G06F 3/01* (2006.01)
(52) U.S. Cl.
 CPC ............. *G01H 1/00* (2013.01); *H02P 25/032* (2016.02); *G06F 3/016* (2013.01)
(58) Field of Classification Search
 CPC .......... G01H 1/00; H02P 25/032; G06F 3/016
 See application file for complete search history.

(56) References Cited

U.S. PATENT DOCUMENTS

| 5,955,799 A | * | 9/1999 | Amaya | H02P 25/032 310/36 |
| 2011/0254782 A1 | * | 10/2011 | Park | H02K 33/04 345/173 |
| 2014/0013842 A1 | * | 1/2014 | Holliday | F16F 15/002 73/462 |
| 2015/0248828 A1 | * | 9/2015 | Cloutier | G01H 1/003 73/579 |
| 2020/0328711 A1 | * | 10/2020 | Mortazav | G01C 22/006 |

OTHER PUBLICATIONS

Torvik, Peter J. "On estimating system damping from frequency response bandwidths." Journal of Sound and Vibration 330.25 (2011): 6088-6097. (Year: 2011).*

* cited by examiner

*Primary Examiner* — Catherine T. Rastovski
*Assistant Examiner* — Aeysha N Sultana
(74) *Attorney, Agent, or Firm* — W&G Law Group

(57) ABSTRACT

The present disclosure provides a method for detecting a bandwidth of a linear vibration motor, including a linear vibration motor which comprises a housing and a motor vibrator. The method includes the following steps: step S1: setting a target displacement level of the linear vibration motor; step S2: measuring a displacement frequency response curve of the motor vibrator with reference to the target displacement level; step S3: comparing the displacement frequency response curve obtained in step S2 with a preset standard target displacement frequency response curve, determining whether the displacement frequency response curve is qualified, and if it is qualified, entering step S4; step S4: measuring a bandwidth of the linear vibration motor.

4 Claims, 4 Drawing Sheets

METHOD FOR DETECTING BANDWIDTH OF LINEAR VIBRATION MOTOR

FIELD OF THE PRESENT DISCLOSURE

The present disclosure relates to detection technology field, more particularly to a method for detecting a bandwidth of a linear vibration motor.

DESCRIPTION OF RELATED ART

With the advent of the mobile Internet era, the number of smart mobile devices continues to rise. Taking the smart mobile devices such as smart phones or tablet computers as carriers, a touch feedback function thereof brings users a multi-level and a multi-dimensional touch interaction experience. Typical examples include: vibration experiences related to notices of short messages and incoming calls; time reminding vibration experiences initiated by alarm clocks and calendars; vibration experiences of low battery reminding; and vibration experiences related to movies and game plots.

At present, the linear vibration motor is a core device which has a touch feedback function. When movies and games are played on the smart mobile devices, the richness and fidelity of touch experiences are mainly determined by a vibration intensity and a vibration frequency of the linear vibration motor, and the vibration intensity and vibration frequency of the linear vibration motor mainly depend on its frequency bandwidth. Therefore, users need to focus on the bandwidth of the frequency of the linear vibration motor while selecting and comparing various kinds of linear vibration motors.

However, each manufacturer adopts different technical solutions for researching and manufacturing the linear vibration motors, and the users can only judge and select them through indexes of the linear vibration motors, but cannot quantify them. A method for detecting a linear vibration motor with clear and accurate concepts and strong implementability is needed in the industry, which method is used for detecting the bandwidth index of the linear vibration motor, thus to select objectively and quantitatively a linear vibration motor model to satisfy customer's needs in various kinds of linear vibration motor models.

Therefore, it is necessary to provide a new method for detecting the bandwidth of the linear vibration motor to solve the above problems.

BRIEF DESCRIPTION OF THE DRAWINGS

In order to more clearly illustrate the technical solution in the embodiments of the present disclosure, the drawings used in the description of the embodiments will be briefly described below. Apparently, the drawings described below are only some embodiments of the present disclosure, according to these drawings, other drawings can still be obtained by those skilled in the art without any creative work, wherein.

DETAILED DESCRIPTION OF THE EXEMPLARY EMBODIMENT

The technical solutions in the embodiments of the present disclosure are clearly and completely described below with reference to the drawings in the embodiments of the present disclosure. Apparently, the described embodiments are only a part of the embodiments of the present disclosure, but not all of the embodiments. Based on the embodiments of the present disclosure, other embodiments obtained by those skill in the art without making any creative efforts, are all belong to the protection scope of the present disclosure.

The present disclosure provides a method for detecting a bandwidth of a linear vibration motor, comprising a linear vibration motor which comprises a housing and a motor vibrator.

The motor vibrator is suspended within the housing so that a vibration is generated by a linear reciprocating motion. A tactile sense of human skin is mainly based on changes of the displacement, and the displacement generated by the motor vibrator in the process of the linear vibration motor vibrating is a direct reflection of vibration intensity. Data of the displacement generated by the motor vibrator are recorded during detection.

Figure 1:
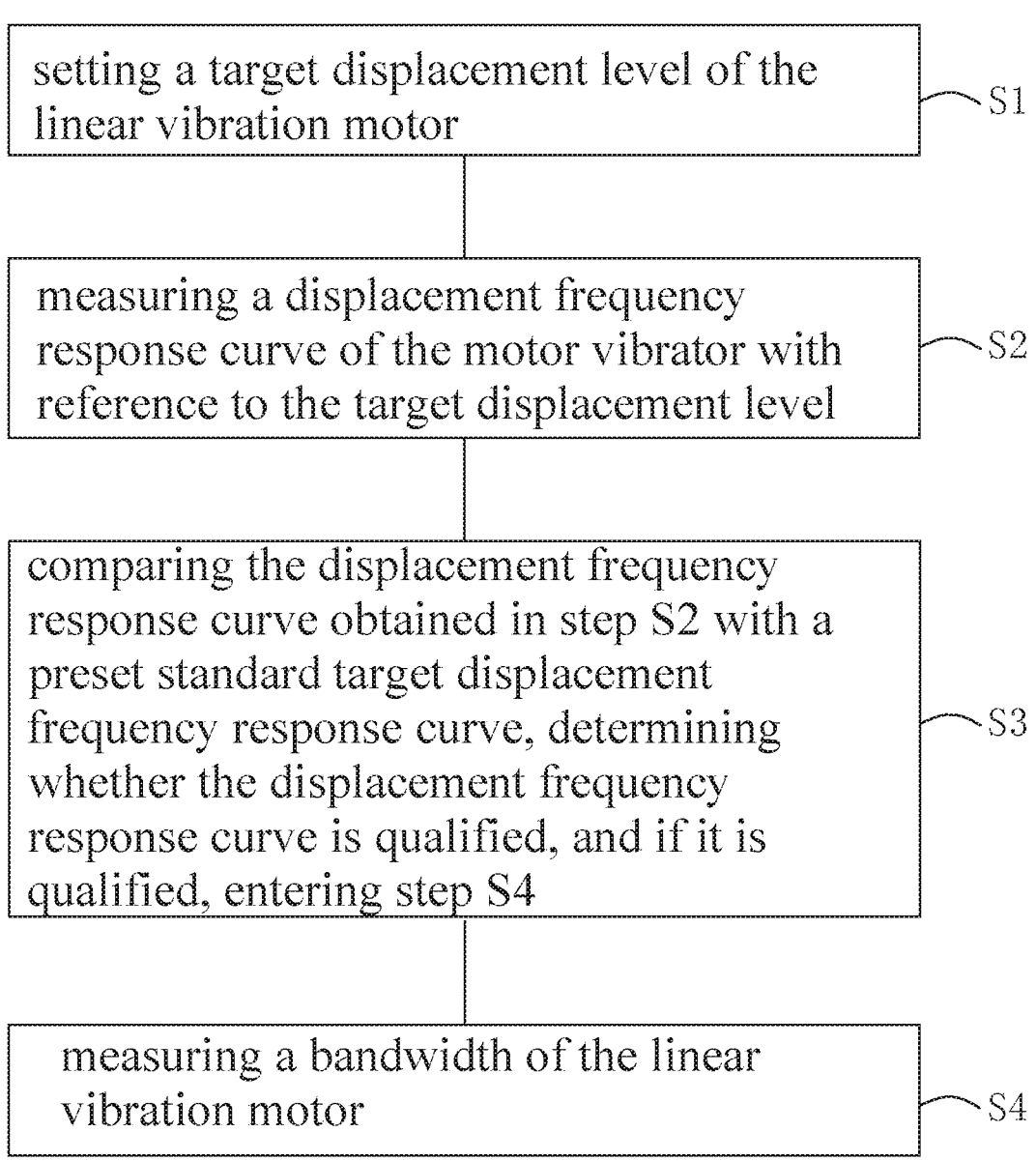
FIG. 1 is a flowchart of a method for detecting a bandwidth of a linear vibration motor according to the present disclosure.

Referring to FIG. 1, the method comprises the following steps:

Step S1: a target displacement level of the linear vibration motor is set. The motor vibrator of the linear vibration motor restricted by the structural limitation of the housing reaches a maximum displacement, which is defined as an ultimate displacement; and the target displacement level is a certain percentage of the ultimate displacement of the motor vibrator, e.g. a 10% of the ultimate displacement.

Step S2: a displacement frequency response curve of the motor vibrator is measured with reference to the target displacement level. In this step, measuring the displacement frequency response curve of the motor vibrator comprises: the linear vibration motor is driven by sinusoidal signals having different frequencies, so that a steady state displacement level of the motor vibrator reaches the target displacement level without exceeding a maximum input voltage amplitude, and the displacement frequency response curve of the motor vibrator is obtained. The maximum input voltage amplitude refers to the maximum voltage amplitude which can be output under the restriction of the driving capability of a power amplifier and a chip. The steady state displacement level of the motor vibrator reaches the target displacement level, wherein, the term "reach" means substantially equal to or close to. In the condition of existing experimental errors, it can be considered as the steady state displacement level has reached the target displacement level and it is permissible to make them equal to each other as much as possible, especially when a value of the steady state displacement level is close to but not equal to a value of the target displacement level.

Figure 2:
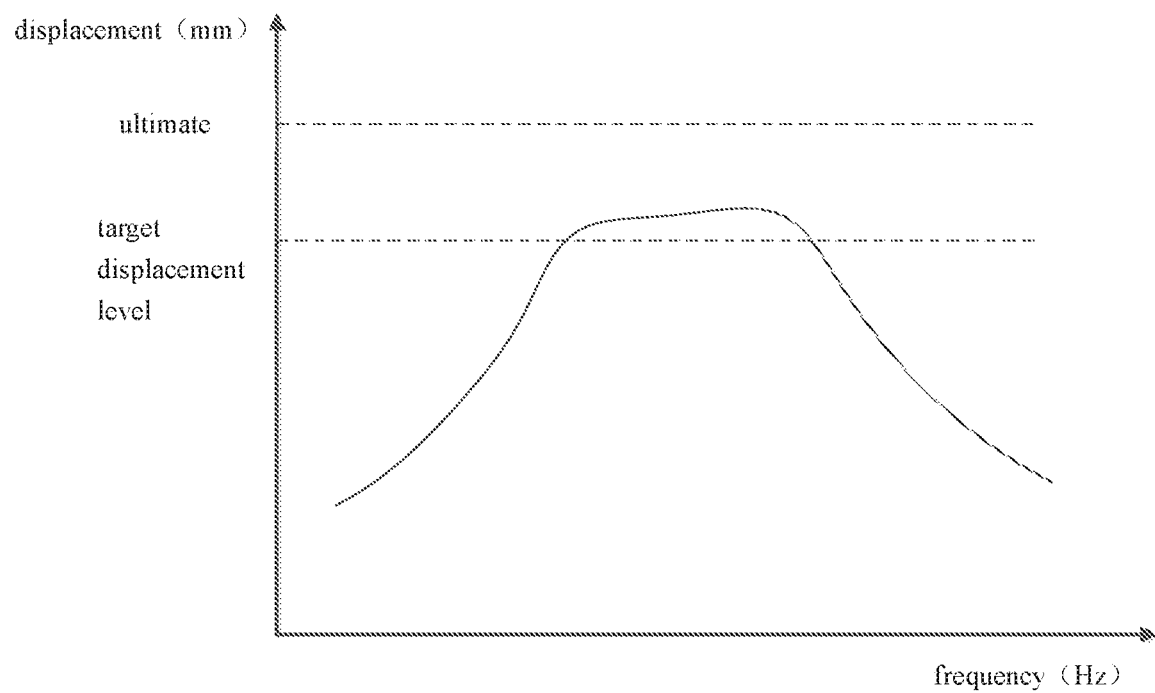
FIG. 2 is a graph showing a standard target displacement frequency response curve in the method for detecting the bandwidth of the linear vibration motor according to the present disclosure.

Step S3: the displacement frequency response curve obtained in step S2 is compared with a preset standard target displacement frequency response curve to determine whether the displacement frequency response curve is qualified or not. If it is qualified, enter into step S4. Referring to FIG. 2, in step S3, if features of the displacement frequency response curve are the same as that of the standard target displacement frequency response curve, it is qualified. Wherein, the features of the standard target displacement frequency response curve are: in a low frequency band, as the frequency increases, the steady state displacement of the motor vibrator increases accordingly; in a middle frequency band, as the frequency increases, the steady state displacement of the motor vibrator remains at the target displacement level; in a high frequency band, as the frequency increases, the steady state displacement of the vibrator reduces accordingly. By determining whether the displacement frequency response curve is qualified, the linear vibration motors have unqualified displacement frequency response curve can be quickly eliminated, and the linear vibration motors have qualified displacement frequency response curve can be forwarded to step S4 for optimal selection.

Step S4: measuring the bandwidth of the linear vibration motor.

Figure 3:
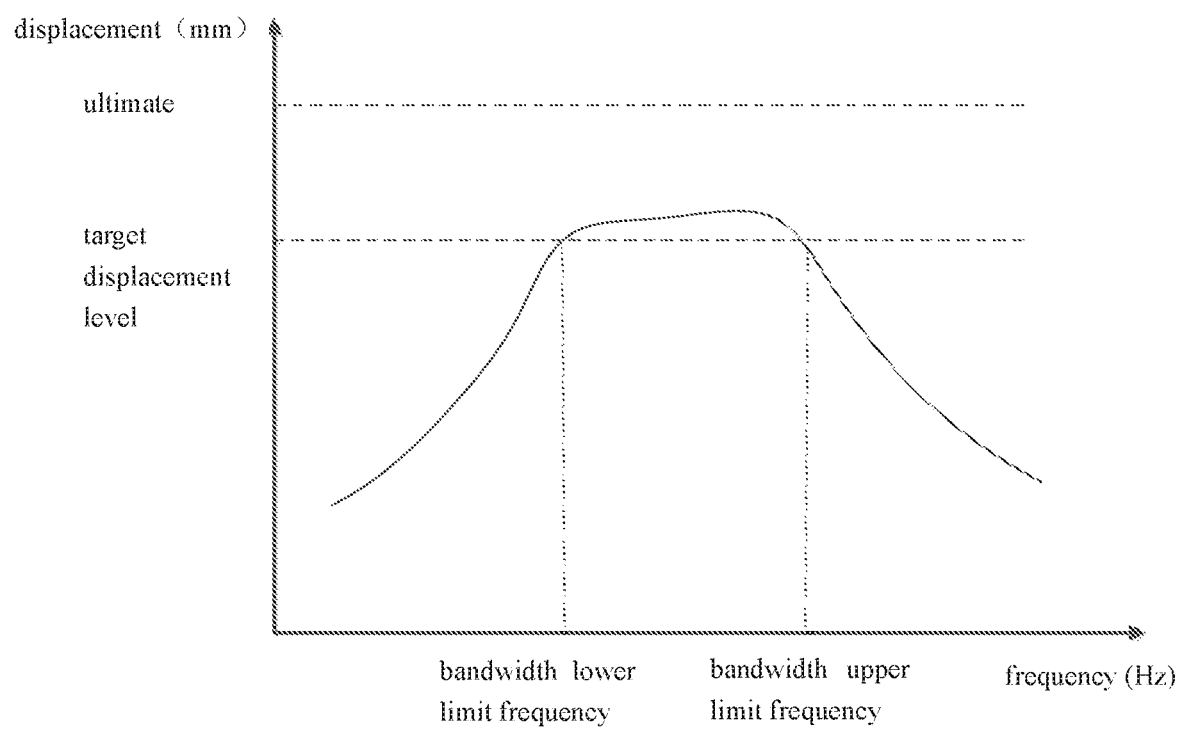
FIG. 3 is a graph showing a displacement frequency response curve, the bandwidth can be calculated with reference to the target displacement level by using such curve, in the method for detecting the bandwidth of the linear vibration motor according to the present disclosure.

According to actual application requirements, the method for measuring the bandwidth of the linear vibration motor comprises the following two types:

Referring to FIG. 3, in step S4, the method for measuring the bandwidth of the linear vibration motor comprises: in the displacement frequency response curve, along with a direction of frequency increasing, a frequency point firstly reaching the target displacement level is defined as a bandwidth lower limit frequency, and a frequency point lastly reaching the target displacement level is defined as a bandwidth upper limit frequency, and the bandwidth of linear vibration motor is obtained by calculating a difference between the bandwidth upper limit frequency and the bandwidth lower limit frequency. The bandwidth is a quantifiable index which can quickly measure and compare the quality of the linear vibration motor.

Figure 4:
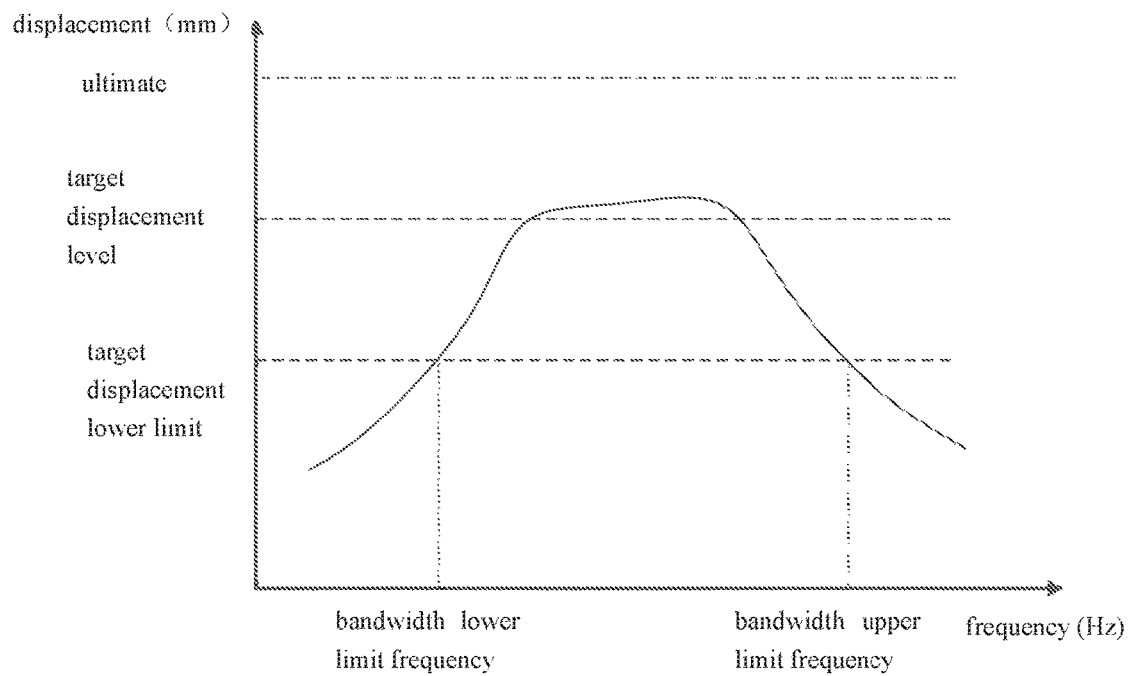
FIG. 4 is a graph showing the displacement frequency response curve, the bandwidth can be calculated with reference to the target displacement lower limit by using such curve in the method for detecting the bandwidth of the linear vibration motor according to the present disclosure.

Referring to FIG. 4, in step S4, the method for measuring the bandwidth of the linear vibration motor comprises: in the displacement frequency response curve, along with a direction of frequency increasing, a first frequency point reaching the target displacement lower limit is defined as a bandwidth lower limit frequency, a last frequency point reaching the target displacement lower limit is defined as a bandwidth upper limit frequency, and the bandwidth of the linear vibration motor is obtained by calculating the difference between the bandwidth upper limit frequency and the bandwidth lower limit frequency. Wherein, the target displacement lower limit refers to a certain percentage of the target displacement level, e.g. a 50% of the target displacement level.

In the embodiment, a productized linear vibration motor is selected for detection by the method for detecting the bandwidth of the linear vibration motor proposed by the present disclosure. It is known that the limit displacement of the productized linear vibration motor is 0.8 mm, and the target displacement level of the motor vibrator is set as 0.6 mm in the detecting process. By adjusting an output frequency of the bandwidth detecting device, the frequency ranges from 50 Hz to 300 Hz; and the displacement data of the motor vibrator is recorded; and the displacement frequency response curve is generated; the displacement frequency response curve is determined as qualified. The following are bandwidth calculations respectively referring to the target displacement level and the target lower displacement limit.

Figure 5:
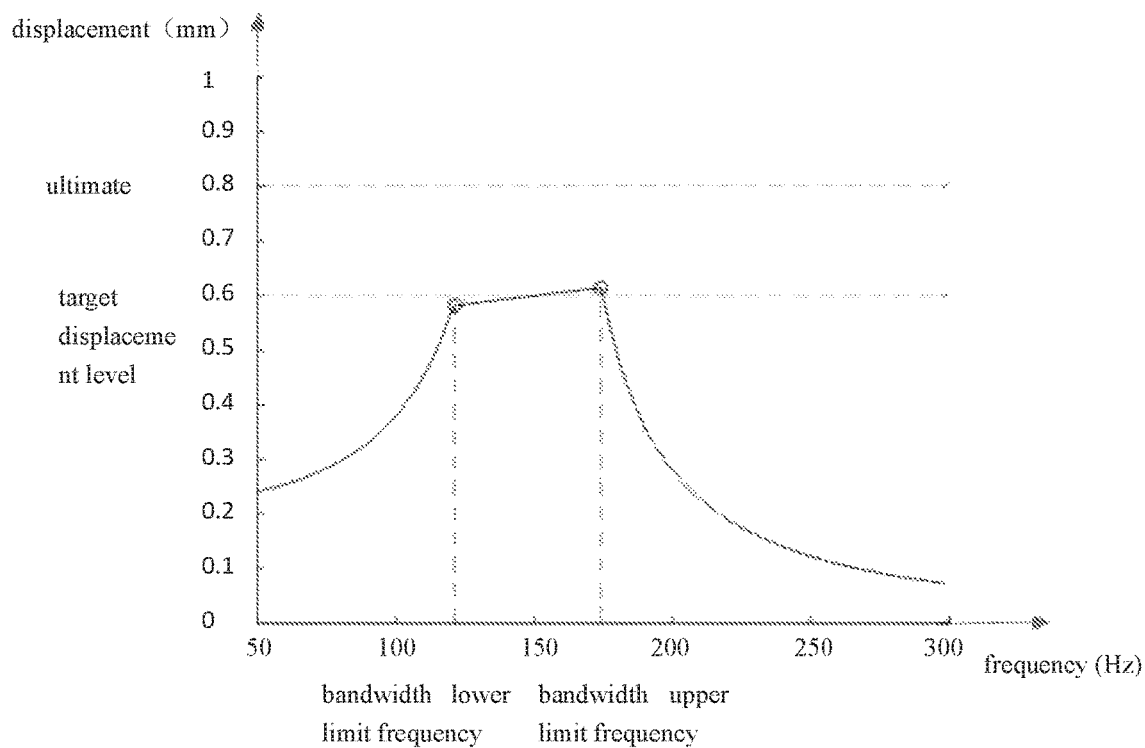
FIG. 5 is a graph showing the displacement frequency response curve of a specific example, the bandwidth can be calculated with reference to the target displacement level by using such curve in the method for detecting bandwidth of linear vibration motor according to an embodiment of the present disclosure.

Referring to FIG. 5, the bandwidth calculation result of the target displacement level of the linear vibration motor is: the bandwidth lower limit frequency is 121 Hz, and the bandwidth upper limit frequency is 174 Hz, therefore, the bandwidth of the target displacement level is 53 Hz. The data is relatively ideal.

Figure 6:
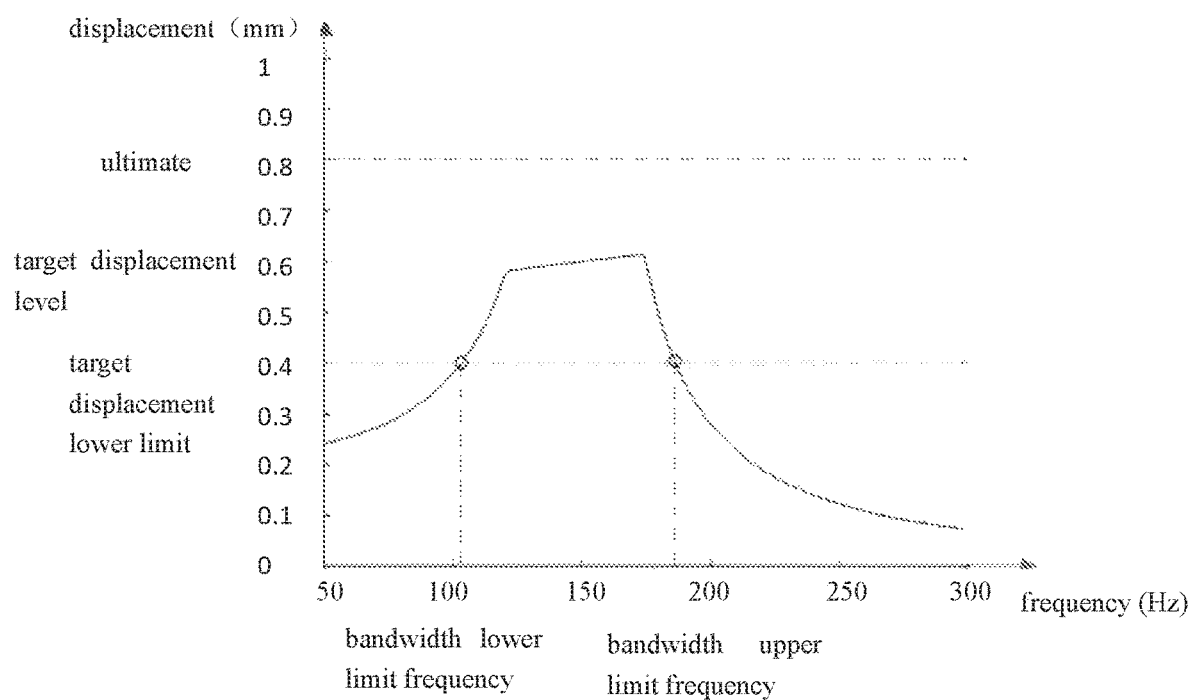
FIG. 6 is a graph showing the displacement frequency response curve of a specific example, the bandwidth can be calculated with reference to a target displacement lower limit by using such curve, in the method for detecting the bandwidth of the linear vibration motor according to the present disclosure.

Referring to FIG. 6, the bandwidth calculation result of the target displacement lower limit of the linear vibration motor is: the bandwidth lower limit frequency is 103 Hz, and the bandwidth upper limit frequency is 186 Hz, therefore the bandwidth of the target displacement level is 83 Hz. The data is relatively ideal.

The above data of the bandwidth both are quantified, and also can quickly measure and compare the quality of the linear vibration motors, wherein a more reliable model selection can be achieved. The method for detecting the bandwidth of the linear vibration motor proposed by the present disclosure is verified as effective with the productized linear vibration motor.

Compared with the related art, in the method for detecting the bandwidth of the linear vibration motor of the present disclosure, measuring the displacement frequency response curve of the motor vibrator by setting and referring to the target displacement level of the linear vibration motor, comparing the obtained displacement frequency with the preset standard target displacement frequency response curve and determining whether the displacement frequency response curve is qualified, wherein if it is not qualified, the linear vibration motor is directly weeded out; or if it is qualified, the bandwidth of the linear vibration motor is measured. The bandwidth is a quantifiable index which can quickly measure and compare the quality of the linear vibration motor. The detecting method is not only simple, but also has high detecting efficiency, good accuracy, low cost. The data of the displacement frequency response curve, the bandwidth of the target displacement level and the bandwidth of the target displacement lower limit obtained by detecting, can provide a reliable basis for product design and selection.

The above is only the embodiment of the present disclosure, and it should be noted that those skilled in the art can still make improvements without departing from the inventive concepts, and these improvements are all belong to the protection scope of the present disclosure.

What is claimed is:

1. A method for detecting a bandwidth of a linear vibration motor, the linear vibration motor comprising a housing and a motor suspended within the housing so that a vibration is generated by a linear reciprocating motion of the motor, wherein the method comprises the following steps:
    step S1: setting a target displacement level of the linear vibration motor;
    step S2: measuring a displacement frequency response curve of the motor vibrator with reference to the target displacement level, wherein the step comprises: driving the linear vibration motor by sinusoidal signals having different frequencies, so that a steady state displacement level of the motor vibrator reaches the target displacement level without exceeding a maximum input voltage amplitude, and obtaining the displacement frequency response curve of the motor vibrator;

step S3: comparing the displacement frequency response curve obtained in step S2 with a preset standard target displacement frequency response curve, determining whether features of the displacement frequency response curve are the same as features of the standard target displacement frequency response curve, and if features of the displacement frequency response curve are the same as features of the standard target displacement frequency response curve, entering step S4;

step S4: measuring a bandwidth of the linear vibration motor, wherein the step comprises: in the displacement frequency response curve, along with a direction of frequency increasing, a first frequency point reaching the target displacement level is defined as a bandwidth lower limit frequency, a last frequency point reaching the target displacement level is defined as a bandwidth upper limit frequency, and the bandwidth of the linear vibration motor is obtained by calculating a difference between the bandwidth upper limit frequency and the bandwidth lower limit frequency.

2. The method for detecting the bandwidth of the linear vibration motor according to claim 1, wherein in step S3, the features of the standard target displacement frequency response curve comprises: in a low frequency band, as the frequency increasing, the steady state displacement of the motor vibrator increases accordingly; in a middle frequency band, as the frequency increasing, the steady state displacement of the motor vibrator remains at the target displacement level; in a high frequency band, as the frequency increasing, the steady state displacement of the vibrator reduces accordingly.

3. A method for detecting a bandwidth of a linear vibration motor, the linear vibration motor comprising a housing and a motor suspended within the housing so that a vibration is generated by a linear reciprocating motion of the motor, wherein the method comprises the following steps:

step S1: setting a target displacement level of the linear vibration motor;

step S2: measuring a displacement frequency response curve of the motor vibrator with reference to the target displacement level, wherein the step comprises: driving the linear vibration motor by sinusoidal signals having different frequencies, so that a steady state displacement level of the motor vibrator reaches the target displacement level without exceeding a maximum input voltage amplitude, and obtaining the displacement frequency response curve of the motor vibrator;

step S3: comparing the displacement frequency response curve obtained in step S2 with a preset standard target displacement frequency response curve, determining whether features of the displacement frequency response curve are the same as features of the standard target displacement frequency response curve, and if features of the displacement frequency response curve are the same as features of the standard target displacement frequency response curve, entering step S4;

step S4: measuring a bandwidth of the linear vibration motor, wherein the step comprises: in the displacement frequency response curve, along with a direction of frequency increasing, a first frequency point reaching a target displacement lower limit is defined as a bandwidth lower limit frequency, and a last frequency point reaching the target displacement lower limit is defined as a bandwidth upper limit frequency, and the bandwidth of the linear vibration motor is obtained by calculating the difference between the bandwidth upper limit frequency and the bandwidth lower limit frequency.

4. The method for detecting the bandwidth of the linear vibration motor according to claim 3, wherein in step S3, the features of the standard target displacement frequency response curve comprises: in a low frequency band, as the frequency increasing, the steady state displacement of the motor vibrator increases accordingly; in a middle frequency band, as the frequency increasing, the steady state displacement of the motor vibrator remains at the target displacement level; in a high frequency band, as the frequency increasing, the steady state displacement of the vibrator reduces accordingly.

* * * * *